United States Patent
Orkin et al.

(10) Patent No.: US 11,252,113 B1
(45) Date of Patent: Feb. 15, 2022

(54) PROACTIVE AND REACTIVE DIRECTING OF CONVERSATIONAL BOT-HUMAN INTERACTIONS

(71) Applicant: Drift.com, Inc., Boston, MA (US)

(72) Inventors: Jeffrey D. Orkin, Arlington, MA (US); Luke W. Van Seters, Meredith, NH (US); Joseph Sorbonne Demple, Boston, MA (US); Jason D. Crouse, Winston-Salem, NC (US)

(73) Assignee: Drift.com, Inc., Boston, MA (US)

( * ) Notice: Subject to any disclaimer, the term of this patent is extended or adjusted under 35 U.S.C. 154(b) by 0 days.

(21) Appl. No.: 17/347,909

(22) Filed: Jun. 15, 2021

(51) Int. Cl.
*G06N 7/00* (2006.01)
*G10L 15/22* (2006.01)
*G10L 15/28* (2013.01)
*H04L 12/58* (2006.01)
*H04L 51/02* (2022.01)

(52) U.S. Cl.
CPC ............ *H04L 51/02* (2013.01); *G06N 7/005* (2013.01); *G10L 15/22* (2013.01); *G10L 15/28* (2013.01)

(58) Field of Classification Search
CPC ......... G06N 7/005; G10L 15/22; G10L 15/28; H04L 51/02
See application file for complete search history.

(56) References Cited

U.S. PATENT DOCUMENTS

| | | | |
|---|---|---|---|
| 8,515,736 B1 * | 8/2013 | Duta | H04M 3/5232 704/9 |
| 8,676,565 B2 | 3/2014 | Larcheveque et al. | |
| 8,694,304 B2 | 4/2014 | Larcheveque et al. | |
| 10,515,156 B2 | 12/2019 | Wooters | |
| 10,818,293 B1 | 10/2020 | Orkin et al. | |
| 2010/0169026 A1 * | 7/2010 | Sorenson | G16B 30/00 702/20 |

(Continued)

OTHER PUBLICATIONS

Gupta, Prakhar, et al. "Controlling dialogue generation with semantic exemplars." arXiv preprint arXiv:2008.09075 (Year: 2020).*

(Continued)

*Primary Examiner* — Daniel C Washburn
*Assistant Examiner* — Oluwadamilola M Ogunbiyi
(74) *Attorney, Agent, or Firm* — David H. Judson

(57) ABSTRACT

Method and system to control a conversational bot uses a directed acyclic graph to specify a desired conversation flow. A graph node has synthetic conversation transcripts annotated with events, wherein an event in a synthetic conversation transcript has preconfigured event expressions that represent ways in which dialogue at the node can unfold. During an on-going conversation with an actor, the system provides a data model uniquely associated with the conversation and that specifies a linear sequence of observations. The data model includes events representing semantically-related conversation fragments located in annotated historical conversation transcripts. In response to receipt of an input in association with a current graph node, the system determines whether the input extends an event in the synthetic conversation transcript associated with the node. If so, a response that continues a current conversation flow in the graph is provided. If not, a response that interrupts a current conversation flow in the graph is provided.

19 Claims, 9 Drawing Sheets

(56) References Cited

U.S. PATENT DOCUMENTS

| | | |
|---|---|---|
| 2011/0238409 A1 | 9/2011 | Larcheveque et al. |
| 2013/0325757 A1 | 12/2013 | Heidasch |
| 2015/0088598 A1 | 3/2015 | Acharyya et al. |
| 2015/0100157 A1* | 4/2015 | Houssin .................. G10L 15/19 700/246 |
| 2016/0323398 A1* | 11/2016 | Guo ................ G06Q 10/06313 |
| 2017/0053531 A1* | 2/2017 | Ullrich .................. G06Q 10/04 |
| 2017/0124457 A1 | 5/2017 | Jerram et al. |
| 2017/0270929 A1* | 9/2017 | Aleksic ................. G06F 40/295 |
| 2018/0121415 A1 | 5/2018 | Perez et al. |
| 2018/0268318 A1 | 9/2018 | Matam et al. |
| 2018/0307672 A1* | 10/2018 | Akkiraju ................. G06N 20/00 |
| 2018/0322403 A1 | 11/2018 | Ron et al. |
| 2019/0108276 A1 | 4/2019 | Kov et al. |
| 2019/0182382 A1* | 6/2019 | Mazza .................... G10L 15/26 |
| 2019/0245922 A1* | 8/2019 | Legtchenko ........ H04L 41/0672 |
| 2019/0266286 A1 | 8/2019 | Torras |
| 2019/0278813 A1 | 9/2019 | Venugopal et al. |
| 2019/0317953 A1 | 10/2019 | Browarnik |
| 2019/0341021 A1* | 11/2019 | Shang .................. G06N 3/0454 |
| 2020/0004835 A1 | 1/2020 | Ramanath et al. |
| 2020/0059559 A1 | 2/2020 | Mazza et al. |
| 2020/0074321 A1 | 3/2020 | Chungapalli et al. |
| 2020/0125678 A1 | 4/2020 | Conley et al. |
| 2020/0134018 A1 | 4/2020 | Laxman et al. |
| 2020/0329144 A1 | 10/2020 | Morgan et al. |
| 2020/0344185 A1 | 10/2020 | Singaraju et al. |
| 2021/0026858 A1* | 1/2021 | Jauhari ............. G06F 16/24578 |
| 2021/0043194 A1* | 2/2021 | Krishnamurthy ....... G10L 15/16 |
| 2021/0065704 A1* | 3/2021 | Kim ......................... G06F 3/167 |
| 2021/0142291 A1* | 5/2021 | Laxman .................. G06F 40/00 |
| 2021/0168110 A1* | 6/2021 | Marmar .................. H04L 51/16 |
| 2021/0200961 A1* | 7/2021 | Shao ....................... G06N 3/049 |
| 2021/0264921 A1* | 8/2021 | Reece ..................... G10L 15/32 |

OTHER PUBLICATIONS

Orkin, Jeffrey David, "Collective artificial intelligence: simulated role-playing from crowdsourced data," Doctoral Thesis, Massachusetts Institute of Technology, Feb. 2013.

Serban, et al., "Building End-To-End Dialogue Systems Using Generative Hierarchical Neural Network Models," arXiv.org:1507.04808v3, Apr. 2016.

Tang, et, "Subgoal Discovery for Hierarchical Dialogue Policy Learning," arXiv.org:1804.07855, Sep. 2018.

* cited by examiner

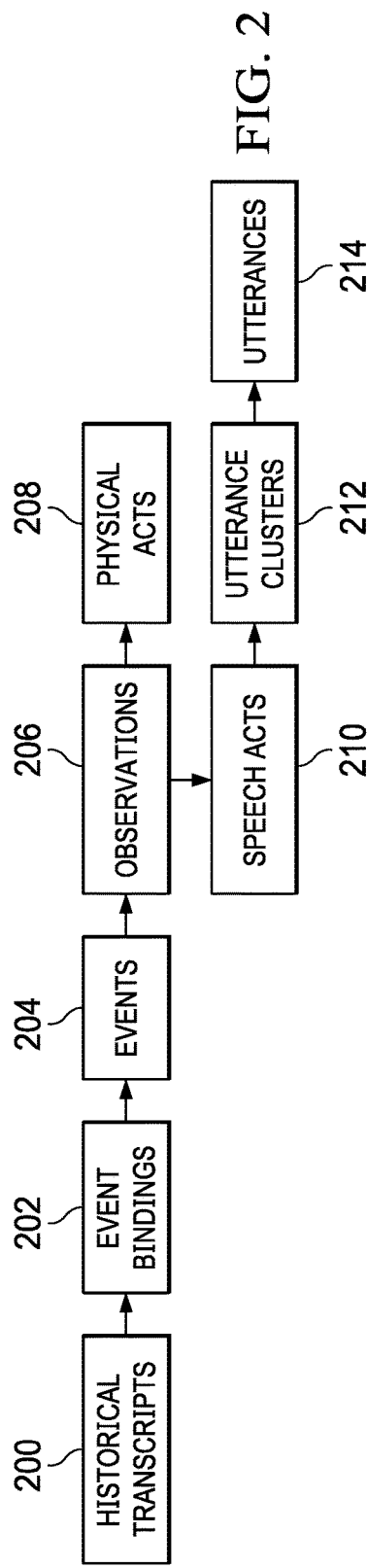
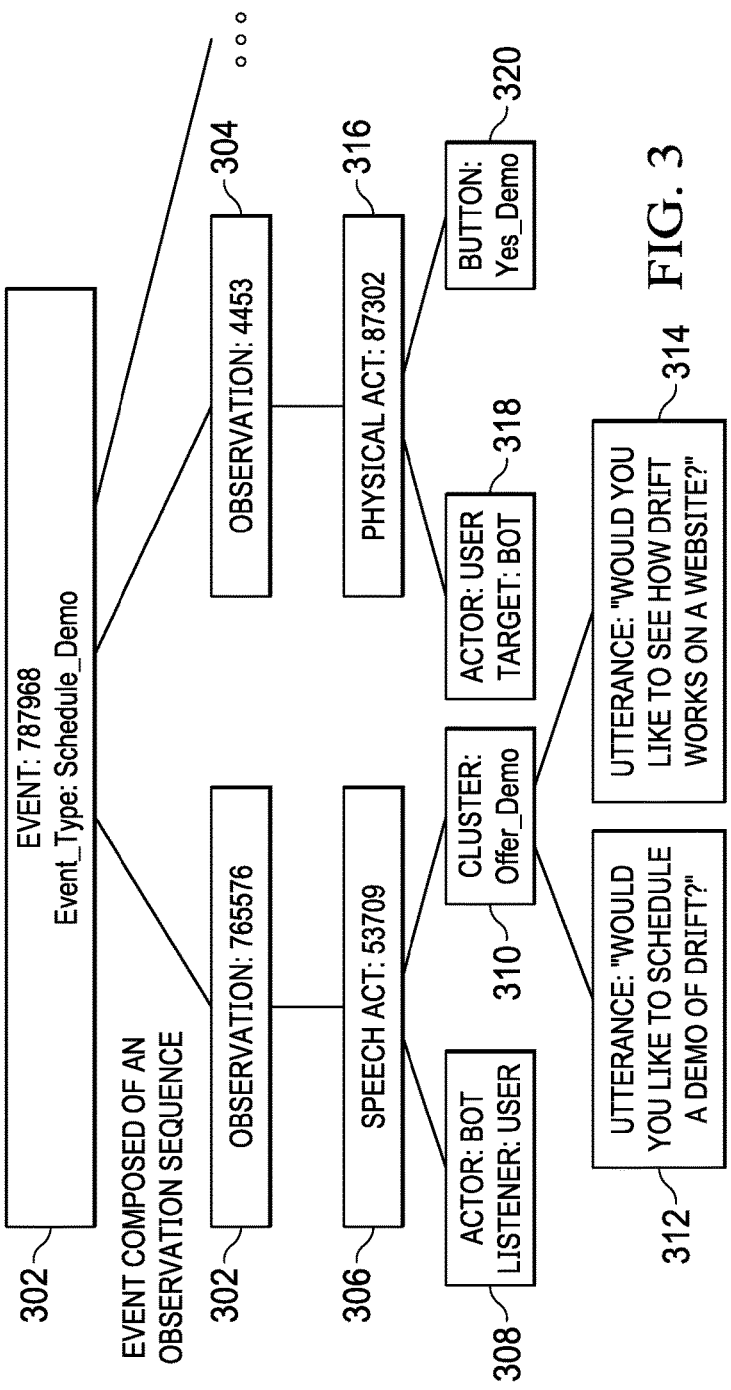
FIG. 2
FIG. 3

FIG. 8

```
"_uc11iajds": {
        "activation_max_turns": 0,
        "activation_min_turns": 0,
        "body": { },
        "children": [
                "_2nm7t3p62",  ⟋ 906
                "_2x10mtsd6",  ⟋ 908
                "_4sokiqg2o",  ⟋ 910
                "_w7bkxu4cn"   ⟋ 912
        ],
        "deactivation_side_effects": null,
        "enabled": true,
        "event": "PB_2055438__UCL1IAJDS_PB_UCL1IAJDS_WHAT_BROUGHT",  ⟋ 902
        "header": { },
        "is_anytime": false,
        "max_tries": 1,
        "prereqs": 1,
                "_25fwkx2id": [
                        {
                                "condition": "prev_slot_equal_to",
                                "value": [
                                        "Yes!",
                                        "Yes.",
                                        "Okay!"
                                ]
                        }
                ]
        },
        "slot": "pb_2055438_pb_uclliajds_what_brought_you__uclliajdsp5d5jfo3o",  ⟍ 904
        "snooze_turns": 0
},
```

900 (top right)

FIG. 9

```
{
    "active_set": "playbook_2055438",
    "assignment_side_effects": null,
    "concepts": [
        "button",
        "cluster"
    ],
    "drift_attribute": null,
    "invalid_values": [],
    "is_goal": false,
    "legal_clusters": [
        "I am currently evaluating solutions.",
        "default"
    ],
    "mask_regex": [],
    "node_type": "question",
    "operator": "set",
    "phys_act_aux_field": "button_value",
    "phys_act_prompt_verbs": null,
    "phys_act_verbs": [
        "I want a demo",
        "I am evaluating analytics solutions",
        "Something else"
    ],
    "prompt_clusters": [
        "pb - uclliajds What brought you to the site today__2055438G5ON3KYGJ2ZPIIRRS43KOZWZ7DJAQPRK"
    ],
    "tag": "set_pb_2055438_pb_uclliajds_what_brought_you__uclliajdsp5d5jfo3o",
    "type": "pb_2055438_pb_uclliajds_what_brought_you__uclliajdsp5d5jfo3o"
},
```

FIG. 10

PROACTIVE AND REACTIVE DIRECTING OF CONVERSATIONAL BOT-HUMAN INTERACTIONS

BACKGROUND

Technical Field

This application relates generally to information retrieval methods and systems.

Background of the Related Art

Online conversational marketing is a well-known technique designed to move buyers or prospects through marketing and sales funnels through the power of real-time conversations. In this approach, and instead of forcing users to go through lead capture forms and wait days for a response, conversational marketing uses targeted messaging, live chat and intelligent conversational bots (chatbots) to engage with users in real-time when they visit a website. A chatbot is a software application that executes on the site and that is used to interact with the user, often in lieu of a direct human interaction. Typically, conversational bots are of several types. A rules-based chatbot follows pre-designed rules that form a decision tree. Decision trees are simple graphs created by hand. They are easy to build, but brittle, and they do not scale. Also, in use, decision trees are proactive, as they control the bot to lead the conversation, typically by asking lots of questions. A more sophisticated approach is an Artificial Intelligence (AI)-based chatbot that uses a different approach from decision trees, namely, intents. Intents use machine learning to classify a user's input, and then activate a corresponding skill. The skill is a context that either uses a graph to direct the flow (like a decision tree), or it has a set of slots that need to be filled by asking questions. Intent-based bots are more robust than decision tree bots, but they are no very flexible to context switches once an intent is activated. Intent-based bots are reactive; they wait for the user to take the lead to tell the bot what he or she wants to do, or what he or she wants to know. Examples of intent-based bots include Apple® Siri, Amazon® Alexa, Google® Home, and the like.

The above-described approaches lend themselves better to customer support conversations, as opposed to sales and marketing conversations. In customer support conversations, for example, a bot-based system identifies the problem and then walks the user through a sequence of prescribed remediation steps. The goal is to end the conversation as fast as possible. Sales and marketing conversations, however, are different. The goal is to engage the prospect, keep them talking, drawing out as much useful information as possible, and then (if a qualified lead) handing off to a human sales representative. To accomplish this, sales and marketing bots need to converse more like real human sales representatives (SDRs), being both proactive and reactive, proactively qualifying leads by asking questions, but reactively (and gracefully) handling interruptions to answer a prospect's questions. The system must also be able to completely redirect a conversational flow as necessary. e.g., based on things the prospect says. The goal is to put the prospect/buyer in control of the conversation to thereby provide a good experience that maximizes the likelihood of moving forward in the sales cycle.

BRIEF SUMMARY

A method and system to control a conversational bot uses a directed acyclic graph (DAG) that is pre-configured to specify a desired conversation flow. In this system, a node in the graph has associated therewith one or more synthetic conversation transcripts annotated with events, wherein an event in a synthetic conversation transcript has one or more preconfigured event expressions associated therewith that represent ways in which dialogue at the node can unfold. During an on-going conversation with an actor, a conversational bot system provides a data model uniquely associated with the on-going conversation and that specifies a linear sequence of observations, The data model include a set of one or more events representing semantically-related conversation fragments that have been located in a set of annotated historical conversation transcripts available to the system. In response to receipt of a given input in association with a current node in the directed acyclic graph, the system determines whether the given input extends an event in the synthetic conversation transcript associated with the current node. Upon a determination that the given input does extend the event in the synthetic conversation transcript associated with the current node, a response is provided. The response is one that continues a current conversation flow in the directed acyclic graph, and typically it is based on the one or more event expressions preconfigured for the event. On the other hand, upon a determination that the given input does not extend the event in the synthetic conversation transcript associated with the current node, a response that interrupts a current conversation flow in the directed acyclic graph is provided. For example, the response that interrupts the current conversation flow is provided when the given input is found in a synthetic conversation transcript associated with a node in the directed acyclic graph other than the current node, when the given input is determined to start a new event in an annotated historical conversation transcript, or when the given input is determined to extend an event associated with a node in the graph other than the current node.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 2 is a block diagram of a relational database comprising a set of inter-related data tables in which a corpus of annotated conversation transcripts is organized to provide storage-efficient informational retrieval according to one aspect of this disclosure;

FIG. 3 depicts a representative data model that is persisted in a database and represents a conversational history for a particular user-chatbot conversation or session over one-to-many turns;

FIG. 8 depicts an annotated event for the first ode depicted in FIG. 7;

FIG. 9 depicts a representative JSON object excerpt from a first (motivations) file for the node depicted in FIG. 7; and FIG. 10 depicts a representative JSON object excerpt from a second (variables) file for the node depicted in FIG. 7.

DETAILED DESCRIPTION

Figure 1:
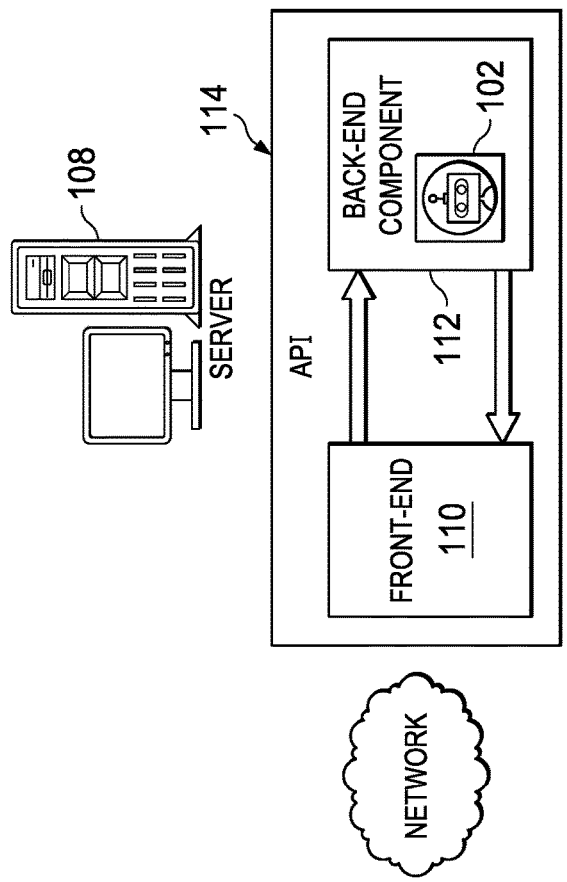
FIG. 1 is a block diagram depicting an information retrieval system in which the technique of this disclosure may be implemented.
Figure 1:
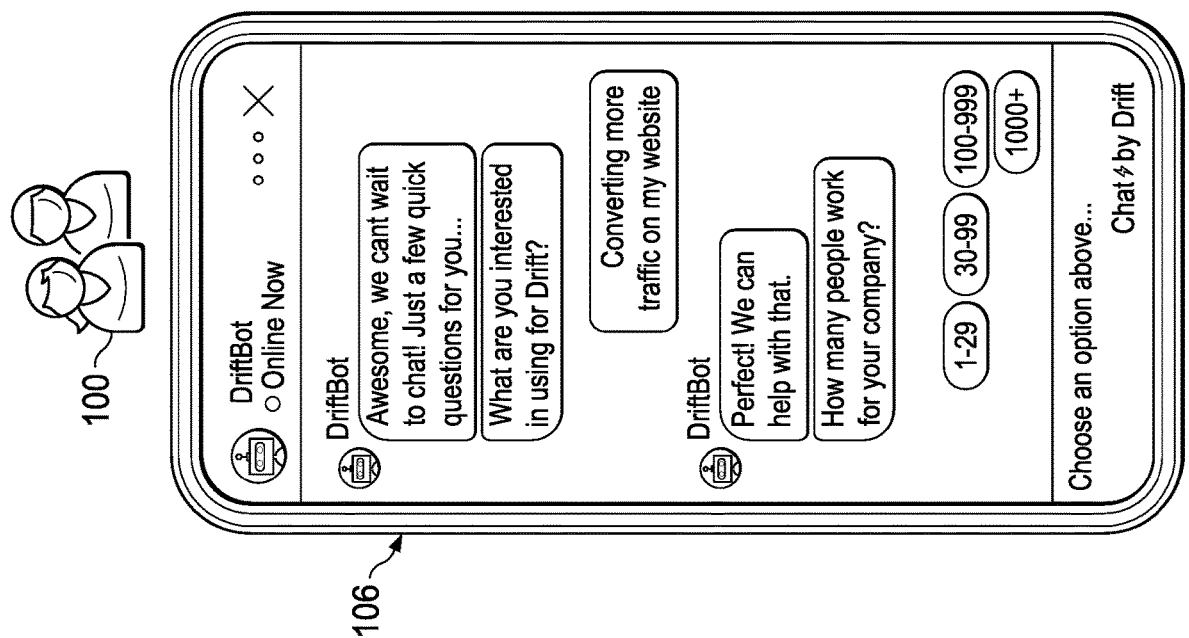

The following is a glossary of terms that are used herein:

Event: a sequence of observations, recognizable as a coherent behavior. Observations within the sequence can be an arbitrary mix of speech acts and physical acts, from multiple actors. One event can be represented by many different possible expressions of that event.

Event expression: one specific sequence of one or more observations that can represent some event. An event may unfold in many different ways, i.e., there may be many different sequences of saying things, and taking physical actions.

Event recognition: inferring which event is unfolding, or has unfolded, by comparing a sequence of observations to sequences that compose the expressions for some event.

Event aliasing: inferring which event is unfolding, or has unfolded, with an inexact match. When an exact sequence is not recognized, a closest inexact match can be determined and presented as an alias such that further processing can then be performed as if the closest inexact match was recognized as a known sequence.

Observation: an atomic action taken by an actor. Each action may be a physical act or a speech act. One or more observations may be intermingled between or among events as the events unfold in parallel, in which case the events themselves are active (in time) concurrently. Each observation is a member of one event, but as noted events can overlap in time, e.g., given observations 1-4, observations 1 and 3 may be part of event 1, while observations 2 and 4 may be part of event 2, such that events 1 and 2 are both active over a time period. As this example shows, observations from different events may be arbitrarily sequenced among observations from other events.

Physical act: a non-linguistic action taken by an actor, e.g., clicking a button or a link on a Graphical User Interface (GUI), entering data in a form, or the like. A physical act also may be received via more sophisticated data entry mechanisms, such as a gesture-based interface that reads and interprets facial expressions, biometric devices that receive and interpret physical features or movements, etc.

Speech act: an utterance expressed by one actor to another, in natural language. A speech act has some purpose for expressing it, and typically it can be expressed in many different ways to accomplish the same thing. The utterance may be typed text (e.g., in a chat window), transcribed from spoken audio, or the like.

Utterance: a sequence of words that is grammatically complete; usually one sentence.

Multi-turn conversation: typically, an interaction between end user participating in a chat, and a conversational hot, typically over multiple question and answer cycles. A multi-turn conversation may involve more than one human user, and more than one bot. For example, a bot may be configured to talk to multiple users concurrently (e.g., participants in a Zoom® web conference).

FIG. 1 depicts a representative information retrieval system in which the techniques of this disclosure may be implemented. In one embodiment, and which is not intended to be limiting, a multi-turn conversation is carried out between an end user 100, and a conversational bot software application 102 that executes in a network-accessible computing platform 104. The end user 100 is a human being that interacts with the platform, typically using a client machine 106 having a browser or mobile application (app). In a typical user case, the software application 102 executes in association with a website 108, although the chatbot functionality may be utilized by multiple distinct websites operated by separate and independent content providers. As such, the computing platform provides the chatbot functionality in a multi-tenant operating environment, although this is not a requirement. The user provides input to the chatbot as speech, as one or more physical actions (e.g., selecting a button or link, entering data in a field, etc.), or as some combination of speech and physical action. The chatbot 102 herein is an AI-based conversational bot. As depicted in FIG. 1, preferably the platform is configured with a network-accessible front end component 110, together with an Application Programming Interface (API)-accessible back-end system 112. The API is depicted at 114. The back-end system executes an instance of the software application 102 for each multi-turn conversation and, in particular, it provides both an understanding of a user's query (a speech and/or physical input), as well as a possible response to this query. Typically, the front-end system handles inputs from multiple end users that access the platform, and individual responses as determined by the back-end system (and in particular the software application instance that is managing the particular multi-turn conversation) are passed from the back-end to the front-end for delivery to the end user. In the context of a chatbot, the response typically is provided in a chat window.

Preferably, during a multi-turn conversation between the user and the conversational bot, it is desired that the system responds to a user input in less than a given time period (e.g., a few seconds) given network latency and transit time, and that such response is both correct and coherent with respect to the history of the conversation so far, i.e., the history of previous utterances or physical actions by the user. To this end, and according to a first aspect of this disclosure, information against which a query is processed preferably is organized in a particular manner. This information typically is a corpus of historical conversation transcripts that are first annotated (e.g., by human analysts) to provide an information database, e.g., queries and associated responses, that have been generated by the system previously. The nature and scope of the annotations are implementation-specific, but the notion is that the database provides a large corpus of possible conversational flows that the system may then use during a real-time multi-conversation between the user and the chatbot.

According to this disclosure, and as shown in FIG. 2, preferably the conversational transcripts 200 are annotated and then re-organized into a set of inter-related data tables that are structured in a specific manner to enable the system to make fast, discrete comparisons between a live conversation (i.e., a current one) and a corpus of conversions that have been seen in the past (i.e., the annotated historical conversations). This re-organization is sometimes referred to herein as packing. The set of data tables comprises an event bindings table 202, an events table 204, an observations table 206, a physical acts tables 208, and a speech acts table 210. The event bindings 202 table stores a set of event bindings, which are entities that connect lines of transcripts with whatever events these lines have been annotated to represent in the transcript. The events table 204 stores pointers to events, wherein an event typically is composed of a linear sequence of observations that represent an expression of the event. The observations table 206 stores pointers to observations that are either physical acts in the physical acts table 208, or speech acts in the speech acts table 210. As will be described, information in the relational database is searched in response to physical acts or speech acts, and the latter typically are organized as clusters of utterances 212. As defined above, an utterance 214 typically is a grammatically-complete set of words, nominally a complete sentence. Thus, and as depicted, the event bindings (event expressions) point to events, which point to the observations, either physical or speech acts. As will be described, this layout of the relational database enables the system to place an utterance or user action into its appropriate context in a highly-efficient manner, thereby giving the user input meaning within the conversational flow. In particular, the tables allow the system to efficiently search for all instances of an utterance or action (speech or physical act) within the annotated transcripts. Typically, the relational database tables are continually updated as the system interacts with end users; in one embodiment, the data tables are repacked periodically, e.g., every 10-20 minutes, although this is not a requirement.

Efficient querying according to the techniques herein is facilitated by representing observations as either speech or physical acts, and which are taken by either actor (conversation participants), and that are fluidly intermixed to form events. To this end, and according to a further aspect of this disclosure, as a multi-turn conversation proceeds, the system generates and persists in memory a data model (or, more generally, a data structure) that represents a conversation history between the user and the bot. Generally, the data model comprises an observation history, together with a set of events that have been determined to represent the conversation up to at least one turn. FIG. 3 depicts an example of one such data model. As depicted, event 302 has a particular event identifier "787968," which is an entry in the events table. The event has a particular type, in this example "Schedule_Demo." Based on the conversation so far, the event is composed of a sequence of observations (looking left to right) including an observation 302 (identifier "765576," which is an entry in the observations table), and observation 304 (identifier "4453," which is another entry in the observations table). Observation 302 points to a speech act 306 (identifier "53709," which is an entry in the speech acts table), which speech act in turn is associated to the conversation participants 308, in this case wherein the "actor" is the bot and the "listener" is the user. As also indicated, the speech act 306 has been associated to an utterance cluster 310, in this example the "Offer_Demo." In this example, the utterance cluster is common to utterances 312 and 314 (e.g., "Would you like to schedule a demo?" or "Would you like to see how the app works on a website?). Although just two utterances are depicted for the cluster, there may be any number of utterances. The entities 302, 306, 308, 310, 312 and 314 thus comprise a hierarchical representation of a first observation in the sequence of observations that comprise the event, and this activity is implemented by the chatbot.

More generally, utterances such as described preferably are used as training data for a machine learning (ML)-based statistical classifier; upon training, the classifier is then useful for both checking for exact matches, as well as for further generalization, i.e., finding other wordings that have a similar meaning to words and phrases recognized by the classifier.

Referring back to FIG. 3, the second observation 304 represents the user's response to what in this example is a prompt from the bot In particular, the observation 304 is associated with physical act 316 having identifier "87302," which is another entry in the observations data table. In this portion of the tree, conversation participants are reversed, such that in entity 318 the "actor" is the user, and the "target" of the physical act is the bot. As also depicted, physical act 316 also points to a particular button 320, representing the user responding that he or she wants to see the demonstration (the "Yes_Demo" action). The data model continues (on the right) with the next follow-on observation, e.g., an utterance by the user, another physical act, and so forth.

As can be seen then, the data model represents each event as being composed of an observation sequence, which is sometimes referred to herein as an observation history. As the data model is persisted (and in the depicted tree grows right-ward), the conversation history between the user and the bot is represented. In particular, and at any point in the multi-turn conversation, the data model comprises the observation history, namely, a hierarchical set of events that have been determined to represent the conversation up to at least one conversation turn (and typically many turns). More specifically, the data model is the observation history (everything said, and every button clicked, since the beginning of the conversation), and a tree of events that the system has overlaid on top of the observations to represent the system's best guess at explaining how a linear sequence of observations breaks down into coherent fragments of conversation. Persisting a data model that is built in this manner (and based on both utterances and physical actions) provides significant advantages because real conversations do not always unfold neatly into a linear sequence of topics. Instead, often they are typically quite messy, fluidly oscillating between several topics.

According to a further aspect of this disclosure, the data model keeps track of any number of events, all of which can be actively "extended" at any time. As described herein, an event can be extended when appending an identified observation creates a new sequence of observations that exactly matches an existing event expression. Thus, an event can be extended if appending the most recent observation creates a new (longer) sequence that exactly matches a sequence in the events table of the relational database. As noted above, the events table against which the matching is attempted is populated during packing, based on human annotation of events found in real human conversation transcripts. When appending an observation to an existing event expression in the data model is not possible, the system determines if it can create a new event with the observation then being the initial observation for the new event sequence. In circumstances when a particular observation does not fall neatly within an event expression (i.e., it cannot be used extend the event), or when the observation does not make sense as a new event, the system then provides a fallback (or failover) operation to enable processing to continue efficiently. This fallback operation is referred to herein as event aliasing.

As defined above, event aliasing refers to the notion of inferring which event is unfolding, or has unfolded, with an inexact match. In particular, when an exact sequence is not recognized, preferably a closest inexact match is determined and presented as an alias such that further processing can then be performed as if the closest inexact match was recognized as a known sequence. When an aliased event is created, the system then proceeds to process the alias event as the event being spoofed (and thus no longer sees the inexact match). Aliasing may be carried out either to extend an event (an "aliased extension"), or even to create a new event ("aliasing a new event"). Preferably, and as noted above, the system first tries to extend an event (using an exact match); then, if extending an event fails, the system then determines if it can create a new event (if this can be done logically given the conversation history so far). Once the latter option fails, the system fails over to attempt to generate an aliased extension and, failing that, performs aliasing for a new event. Event aliasing is advantageous, as it enables the system to provide coherent and appropriate responses even when the database lookup does not return exact (or otherwise useful) results. The mechanism enables the system to pretend it has seen a sequence of observations that exactly matches something in the database, when in reality the system observed something very similar but that, e.g. skips an utterance in the middle, re-orders two utterances within the sequence, or the like. Event aliasing enables to system to operate coherently even when there is no exact match for a sequence that can be extended with the most recent observation. In this manner, the sequence is auto-corrected to something that is close enough to what has been observed. This approach ensures that the rest of the system functions efficiently with exact look-ups into tables within the relational database.

The intelligent packing of the relational database, and the use of the data model structured as described, enables the system to participate in a multi-turn conversation, coherently, and quickly. The system has several options for flexibly understanding the meaning of an utterance, where aliasing is the fallback, and where meaning is ascribed based on which observation is seen at which step of an event, within a sequence of events that compose a conversation. Events are of arbitrary length, and they can overlap in time with other events. Thus, and although not depicted in the example event hierarchical representation shown in FIG. 3, multiple events may be active concurrently.

In this example depicted in FIG. 3, two different utterances are indicated as being members of an utterance cluster. Preferably, and mentioned above, the system defines utterance clusters by training a machine learning (ML) classifier.

Figure 4:
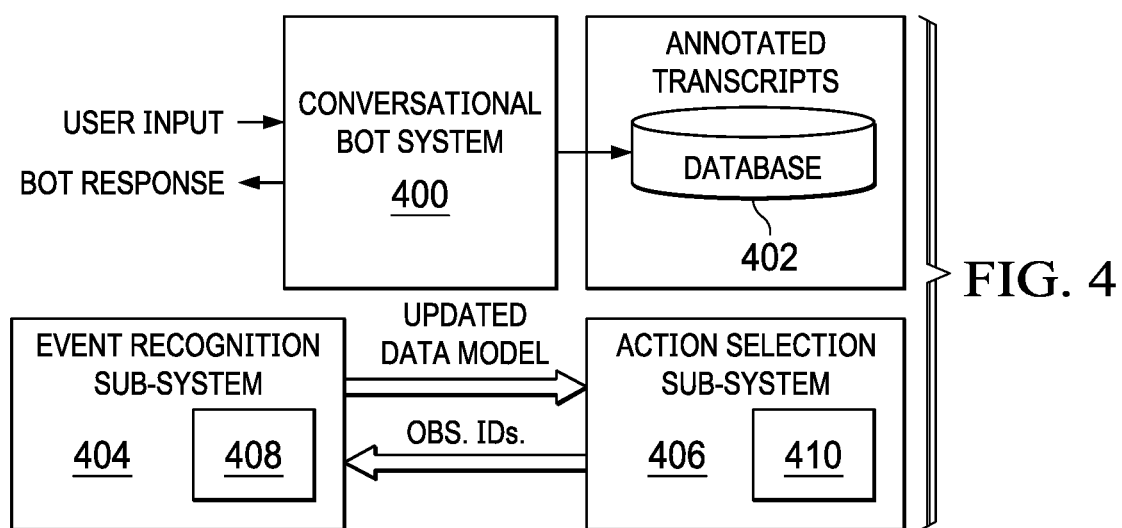
FIG. 4 depicts a representative system interaction showing processing of a user query according to an embodiment of this disclosure.

A conversational bot system 400 that implements the techniques of this disclosure is shown in FIG. 4. The system is configured to process a query (e.g., a user utterance or physical act) within a given turn of the multi-turn conversation. It assumes that the corpus of annotated conversation transcripts is packed into a relational database 402 comprising the set of inter-related tables as shown in FIG. 2. Preferably, these tables include a table of events, a table of observations, a table of physical acts, and a table of speech acts. As will be described, the relational structure includes the pointers (keys) identified, and preferably look-ups in to the database are performed on a constant-time basis such that only a single database query into the data structures is required for each database access (although there are typically several of such accesses as will be described).

At a high level, the system 400 comprises several main components, namely, an event recognition sub-system 404, and an action selection sub-system 406. The event recognition sub-system 404 has several basic functions. Initially, and upon receipt of a new user input, the event recognition sub-system 404 tries to decide how to interpret what was actually said to the bot given what has been observed previously. Typically, an input can be successfully interpreted if two conditions are met: (1) the user's input can be recognized as a speech act or physical act that exists as an observation in the historical data, and (2) this observation can legally extend an event or start a new event, giving contextual meaning to the observation.

As noted above, event recognition is the process of first trying to extend an event, or adding a new event, or (failing those options) performing aliasing. In general, this evaluation is carried out using an initial lookup into the database of historical transcripts to identify one or more candidate interpretations, followed by a filtering of the candidates for coherency (sometimes referred to herein as "coherency filtering"). More formally, a candidate interpretation typically corresponds to some human annotation found in the historical conversation transcripts that were indexed during the packing operation. In one exemplary implementation, the candidate interpretation is a pointer identifying specific lines of historical data in the set of inter-related tables that comprise that relational database 402. Another way of describing a candidate interpretation is as an instance of observations, e.g., one candidate interpretation might be a specific utterance in a specific transcript that expresses the speech act "hello" with the line "hey man nice to see you." Multiple candidate interpretations are identified by a set of pointers to specific lines in the transcripts, representing instances of observations.

Preferably, the input to event recognition sub-system 404, where the system tries to extend an event, etc., is represented as a sequence of observation identifiers (IDs), rather than instances. An ID is akin to a type of observation that may appear many times in the annotated historical data, rather than one instance of an observation with that ID. To take a concrete example, assume the user utterance is "hello kind sir." The classifier is run against the utterance, and in this example the classifier assigns the utterance the speech act label "hello." From this, the system looks up a speech act ID (for this label) from the speech acts table. Then, from this speech act ID, the system looks up an associated observation ID in the observations table. These lookups typically are done at once, through SQL table joins. After determining what observation ID "hello kind sir" maps to, the system tries to use this observation ID to first extend an event. To this end, preferably the data model is updated to reflect that the event is extended (at this point, merely an assumption that the event can be extended), and it is the resulting modified event that the system then uses to perform the initial lookup described above, namely, to fetch the one or more candidate interpretations. These candidate interpretations are instances of observations with the observation ID previously mentioned, e.g., where the system found things like "hello."

In addition to obtaining the one or more candidate interpretations, the event recognition sub-system 404 evaluates the candidate interpretations that it fetches, with the goal of identifying one candidate interpretation that it will then provide to update the data model before that updated model is then provided to the action selection sub-system 406. In this initial pass, the event recognition sub-system 404 functions to attempt to understand the user's input. A mechanism 408 for performing this function preferably comprises a set of evaluation agents that are sometimes referred to herein as "critics." Critics preferably operate over candidate interpretations. As used herein, a critic typically is a software agent (e.g., implemented as a Python class) that evaluates a candidate interpretation against a statistical model, a set of hard-coded rules, or some other data or criteria, in each case to determine whether the candidate interpretation should be used to potentially update the data model. Preferably, there are a plurality of separate and distinct "critics," with each critic providing a particular type of analysis, and a particular candidate interpretation must pass each and every critic. In other words, preferably the critics collectively provide a Boolean AND function such that a candidate interpretation is not accepted for use to update the data model unless all critics are satisfied. Although this approach is preferred, the all-or-nothing criteria may be relaxed. The nature and processing performed by a critic may vary from computationally-simple tasks (e.g., evaluation of business logic), to more complex evaluation tasks (e.g., evaluation against a statistical model). The critics may be arranged sequentially, such that the more computationally-simple tasks are tested before the more complex ones. Critics may also operate in parallel with one another, and one or more critics may be combined into a single critic. In this manner, the critics selectively filter the candidate interpretations so as to ensure that the bot operates coherently and consistently given the conversation so far.

As noted above, event recognition tries to extend an event if it can do so. To this end, and as part of the event recognition function, the critics are executed against the set of candidate interpretations. If this initial pass through the critics returns a positive result, work of the event recognition sub-system is done (for this first pass), as the sub-system has recognized the user's input. If, however, the initial pass through the critics returns empty-handed (i.e., no candidate interpretation survives), then the event recognition sub-system tries to assign a new event. The new event is a new instance of an event that will initially have only one observation in it, namely, a candidate interpretation that makes it through the critics. To this end, a second pass through the critics is performed. This second pass may or may not identify a candidate interpretation. If a candidate interpretation passes the critics, it is used for the new event. If, however, evaluation of the new event also returns empty-handed (i.e., no candidate interpretation logically starts a new event), the routine then continues by moving on to event aliasing. As noted above, first the system tries an aliased event, where the system allows an aliased addition, namely, where a new instance of an event is started at a position in the conversation where the system has not seen (in the historical data) that kind (label) of event start. Once again, the critics are run again in an attempt to find a candidate interpretation. Processing efficiencies are provided by caching results of the critic evaluations where possible. The result of this iterative process (trying first to extend an event, or start a new event, or aliasing an event, etc.) is a given candidate interpretation, and processing then continues at the action selection sub-system 406.

To this end, the given candidate interpretation identified by the event recognition sub-system is applied to the data model to produce an adjusted data model. As used herein, adjusting the data model may involve an addition to the data model, or not rolling back a change (which typically occurs when a candidate interpretation is rejected by a critic). The adjusted data model is then applied as an input to the action selection sub-system 406, whose primary function is to propose what observations might come next. To this end, action selection sub-system 406 tries different ways of navigating the transcript data to come up with a set of one or more such observation(s) that might logically come next. An observation identified by the action selection sub-system represents a component of an imagined future state of the conversation. Preferably, the action selection sub-system does not evaluate correctness (coherency) of the observation. Instead, and as described below, action selection sub-system 406 hands the observations (in particular, their observation IDs) that it identifies back to the event recognition sub-system 404, which then repeats its above-described operations(s) to evaluate correctness (coherence filtering). Thus, and according to this disclosure, the event recognition sub-system is used to both understand the user, and to select a response to return to the user.

The action selection sub-system 406 preferably operates as follows. Taking the adjusted (modified) data model as input, it performs an additional database lookup pass through the historical transcripts in the database 402, and in response generates a set of next possible observations. If these observations were to be applied to the data model, the resulting data model would represent one or more imagined future states of the conversation. As such, this set of observations represents possible responses that might be returned by the bot (as a response to the new user input). The action selection sub-system 406 then iterates over different ways (strategies) to suggest what observation(s) could come next, and it returns a resulting set of observation IDs (corresponding to the identified observations) back to the event recognition sub-system 404, thereby re-cycling them back through the coherency filtering process to test their coherency. Using the set of observation IDs proposed by the action selection sub-system, the event recognition sub-system 404 again tries to extend the event, etc., once again performing a query into the database for candidate interpretations. The above-described processing by the event recognition sub-system 404 is then repeated. In particular, the critics in the event processing sub-system 404 are then run over the candidate interpretations to find one single approved candidate (an instance). At this point the system has found a coherent response to the user input, the data model is adjusted to include it, and this response is then selected to be returned.

Preferably, the action selection sub-system 406 includes a mechanism 410 to identify the set of observations. Akin to the critics in the event recognition sub-system 404, the mechanism 410 comprises a set of evaluation agents that are sometimes referred to as "action selectors." As used herein, an action selector typically is a software agent (e.g., once again implemented as a Python class) that provides a strategy for navigating through the transcript data. Preferably, there are a plurality of separate and distinct "action selectors," with each action selector providing a particular strategy for navigating through the transcript data. The nature and processing performed by an action selector may vary from computationally-simple tasks, to more complex evaluation tasks. A simple action selector just tries whatever came next in one particular log. A more complicated action selector tries to find ways to complete events that are otherwise hanging open. Or, a selector might try to urge the bot to start an event that will capture some variable value that the bot knows it needs. These are just example action selectors. As the action selection sub-system iterates over its action selectors, one or more observations (of what might come next) are identified and sent back over to the event recognition sub-system, as previously noted. Once an action selector has found an observation that is then approved via event recognition, the operation of the action selection sub-system ends.

In operation, action selectors may be arranged sequentially, such that the more computationally-simple tasks are tested before the more complex ones. Action selectors may also operate in parallel with one another, and one or more action selectors may be combined into a single action selector. Preferably, as an action selector identifies a possible observation that could come next, it is returned to the event recognition sub-system for filtering, even as other action selectors are still executing. In another embodiment, all of the action selections are enabled to complete their processing before the resulting one or more observations are returned (in effect, in batch) back for filtering Critics and action selectors may be the same or distinct software agents. By way of example, the following agents apply to both event recognition and action selection:

CriticStaleExtension—after some number of conversational turns have passed, it becomes unlikely that something someone just said is supposed to be interpreted as an extension of something said long ago in the conversation. This critic rejects an interpretation that tries to extend an event that has not changed in the recent several turns.

CriticExtendedEventTypeChange—sometimes extending an event with one more observation changes the label (and thus the meaning) of that event. The system needs to be careful about allowing a semantic shift like this. If the original event was not an alias, and changing the event label leaves it in a position in the conversation history where this ordering of events has not been observed, then the label change (via the event extension) that would lead to this unfamiliar ordering of events is not allowed.

ActionSelectorContinueLog—this is the simplest action selector. Every time critics approve a candidate interpretation, the system records in the data model which line of which transcript that candidate pointed at. This action selector blindly proposes that the next thing to say is whatever was said next in that particular transcript.

ActionSelectorCompleteEvent—this action selector detects that the data model contains one or more events that cannot yet be considered complete—they still require extension with more observations before they represent a whole instance of that event. This action selector proposes the bot say (or do) something next that would be the next step in extending some existing event, to get it closer to completion. For example, if someone asked the bot "how are you today?", that begins an event that is not complete until the bot responds with "I'm well."

ActionSelectorMotivation—this action selector encourages the bot to say something that prompts the user to answer with some missing piece of qualifying information (e.g., in the context of qualifying sales leads). For example, the bot is aware that it still needs to know how many employees work for some company, so if the simpler action selectors fail, it tries to move the conversation forward productively.

The following agents are only used during action selection:

CriticDuplicateUtterance—prevents the bot from saying the exact thing it has said previously within the same session;

CriticBizrule—prevents the bot from saying something that contradicts some piece of business logic. For example, this agent ensures that the bot does not say "sure, we will connect you to one of our sales reps right away!" if the system has already detected that this user's company is in an industry or geographic location that is not being serviced. After the critic rejects this candidate bot response, it moves on to another candidate that will get approved that might say "sorry, we don't offer service in your location. Would you like to join our waiting list to be notified when coverage is extended?" or the like.

The above example agents are not intended to be limiting.
Motivations—Combining Proactive and Reactive Behavior As noted, real human conversations are messy, with frequent context switching and continued talking, often about multiple topics in parallel, or in arbitrary orderings. The event-based system described above addresses this by providing a data model that includes the event layer that organizes observations in the observation history of the data model into semantically-related conversation fragments (from annotated historical conversations). This enables the bot to more flexible to context switching, thereby providing much more realistic conversational flow.

In the event-based system as described, either the actor or the bot can initiate an event at any time. Typically, the bot will initiate an event when it is following events in a transcript, such that, when one event ends, the next event in that transcript begins with a bot utterance. This approach is opportunistic in terms of when the bot decides to drive the conversation, but the approach is based on what the system finds happened in the past (in the annotated historical transcripts). The following describes a technique by which the bot is controlled to be more deliberate in how it drives the conversation forward proactively.

According to this aspect, the event-based AI is augmented with a data structure that configures an explicit representation of a desired conversation flow. The data structure is a directed acyclic graph (DAG), sometimes referred to herein as a directed graph. In this approach, the system receives input data, e.g., from a human designer, and in response configures a directed acyclic graph (DAG) that represents a conversation flow. The directed acyclic graph comprises a set of nodes, and wherein a DAG node includes a conversational bot prompt, a set of possible human responses to that prompt, and an indication of a default path when one of the set of possible responses is not received. More formally, a DAG node has associated therewith a set of "synthetic" conversation transcripts, with the notion of "synthetic" here meaning a system-generated construct (something generated by automation), as compared to an "historic" conversation transcript that is a construct the system captures from (or otherwise obtains about) an actual human-bot interaction. As will be described, both types of transcripts include events, as defined herein. In particular, an event in a synthetic conversation transcript has one or more preconfigured event expressions associated therewith and that represent ways in which processing at the node can occur. An event in the data model also has associated therewith a set of event expressions, which correspond to semantically-related conversation fragments that have been located in the historical conversation transcripts.

According to this disclosure, and as will be described, the DAG and the data model work together to control the bot. In particular, the bot uses the DAG as a guide to drive what question to ask next, but the approach also enables the bot to be resilient to interruptions at any time. Thus, for example, assume the human user does not want to answer the bot's questions, and instead asks their own. This is sometimes referred to herein as "Q/A content." Using the combined DAG and data model, the bot respects such choices, even if this sometimes results in adapting the conversation to a completely different flow. Based on the DAG, and in cases where the bot can answer an isolated (random) user question, the bot can then resume following the specified workflow where it left off. Further, and using the DAG approach described herein, if the bot already knows the answer to one of the questions specified at a node (of the graph), it can skip that node and move onto the next question. The bot might know the answer, for example, because a similar question was already asked (and answered) somewhere else in the graph. The bot might know the answer from contact attribute (or other such) values passed into the bot when the conversation session started. An example of the latter scenario is where the system remembers the email addresses of users who have previously volunteered such information, or where user identifiers are stored in cookies.

The DAG-based workflow herein preferably is implemented by an additional Action Selector, and an additional Critic. In particular, "ActionSelectorMotivation" is an action selector that references the DAG to search from the root thereof to find a question for the bot to ask that the bot does not already know the answer to. Technically, the action selector is looking for a bot prompt that leads to assigning a value to a variable that the system does not know the value of yet. Preferably, this action selector is assigned a lower priority than other action selectors that simply continue following a same historical transcript (already referenced by the data model), but it is assigned a higher priority than more complicated action selectors that, say, look for a new event to start in other transcripts. This action selector is associated with a critic, referred to as "CriticMotivation," which operates to restrict the bot from initiating a new event driven by the directed graph if an event is already in progress and waiting for the bot's response. When the critic is implemented, the bot can only prompt with a next question when the human is not waiting for the bot to respond to something the human has just said.

As will be described below, the directed graph is a graph of variables to be assigned, together with how to branch based on the variable(s) values that have been assigned. Associated variable definitions are referenced to determine what text prompt the bot should use to ask the user for any value of any variable. As noted, the graph comprises nodes, where each node includes a bot prompt to ask the user a question, and a set of possible responses the human may give, e.g., by clicking a button, or typing open ended natural language that gets classified into one of the labels recognized by a statistical model (as was described above). Each node also preferably implements a response that is considered a default path if the system does not receive any of the expected responses. This directed graph may be built in a visual design tool, but this is not a requirement, as the graph may be specified explicitly using other input devices and systems. The DAG may be based on a template, and it may alternatively be specified programmatically. Once created, the AI system imports the graph and uses it generate a set of synthetic transcripts (as opposed to the annotated historical transcripts described above in the event-based system) for each node. Each node in the directed graph becomes an event. Preferably, there is one synthetic transcript per node in the directed graph and that contains all event expression associated with that node. Each event has one or more event expressions, which represent the various ways that the event can unfold, depending on which of one or more responses are received from the user.

According to a further feature, the directed graph-based approach herein facilitates the notion of what are referred to herein as anytime behaviors. In particular, there are some requests that the user might make that should redirect the flow of the conversation. This logic is embedded (embeddable) in the directed graph. When an anytime behavior is specified (and reached), the bot should adapt the conversational flow accordingly regardless of where the flow is in the directed graph at the time the user makes the request. Non-limiting examples include high-intent request (like asking for a product demonstration, or asking to book a meeting with an SDR, or requests to talk to a human immediately and thus indicate frustration, etc.). According to this feature, an anytime behavior is configured anywhere in the directed graph and, in particular, as a sub-graph by building it as a child of a special (dedicated) node, e.g., using a prompt such as "##special." The system reorganizes the directed graph to reflect a specified anytime behavior(s), and such behaviors (depending on how they are specified) may be conditional.

According to another aspect, the directed graph-based approach facilitates another type of control, which is referred to herein as route blocking. What is typically blocked in this context is the "route" to a human user, e.g., an SDR. In particular, there are some sub-paths of the directed graph that a designer will want to block, e.g., if the system learns specific things about the user. For example, the bot designer/enterprise may specify that if the system learns that the user is a student, or is interested in one type of plan over another, or perhaps just has a support question, etc., the designer/enterprise may determine that directing an SDR for this purpose may be counter-productive. To avoid such situations, and to the extent the directed graph would otherwise include one or more "routes" to the SDR, the directed graph is instead configured/augmented with route blocking. In one embodiment, this is achieved by setting up a special node (at any particular location in the graph) that lists one or more classifier labels that should trigger blocking one or more follow-on paths of the directed graph. Once any of the specified classifier labels have been recognized, the route block associated therewith is triggered, and the bot blocks paths of the directed graph that otherwise would lead to routing to the SDR, that lead to scheduling meetings with a human, or the like. When route blocking is implemented, the designer/enterprise can optionally specify an alternative path for the bot when encountering a blocked path. For example, if the actor is identified as a student and asks to talk to someone in Sales, the bot can be configured (using route blocking) to gracefully decline to the request (e.g., "Sorry, no one is available to speak right now; you might want to look at our pricing page here [URL].") The notion of "route" blocking is not limited blocking paths that lead just to human operators, as they may be other business logic that implements this type of blocking operation.

By combining the data model and DAG-based techniques, the bot system enforces both a top-down goal-oriented approach (following particular paths) while providing the bot with flexibility to act reactively, e.g., by starting a new event when a user interrupts to ask an unexpected question or makes an unexpected request (e.g., "show me a demo"), implementing an anytime behavior that moves the flow to a completely different location in the DAG, etc.), as well as the associated ability to then return back to where it was in the top-down processing specified in the directed graph. Generalizing, the bot follows the proactive path(s) specified in the DAG but allows for reactive response handling if and when called for by the activity during the conversation. This coordinated approach overcomes the limitations of decision trees.

A representative implementation of the combined data model and DAG-based system is now described. As noted above, the data model system is associated with a collection of annotated historical transcripts, whereas the DAG-based system is a graph of nodes, wherein a node has a collection of synthetic transcripts. Events are overlaid onto the transcripts, grouping sequences of utterances that form a semantically-related fragment of conversation. As also explained, the directed graph is a graph of variables to be assigned, together with how to branch based on the variable(s) values that have been assigned. Associated variable definitions are referenced to determine what text prompt the bot should use to ask the user for any value of any variable. In this embodiment, the directed graph is instantiated with an additional "motivations" data file that the bot imports when it starts a conversation. The data file (a "first" file) comprises a JSON-based specification of the directed graph structure, typically as a set of nested JSON objects, starting with a root node. For each node in the graph, the first file specifies the identity of each variable to which a value is to be assigned, as well as the branching that is to be implemented based on what value gets assigned to the particular node. A separate "variables" files (preferably also expressed as a set of JSON-based objects) is associated with the first file and, for each variable specified in the first file, this second file defines the type of variable (e.g., number, text, etc.), and specifies one or more prompt(s) that the system should use to get the value for the variable. Variables associated with anytime behaviors do not require any type of prompt. The first and second files may be implemented as one integrated file.

Figure 5:
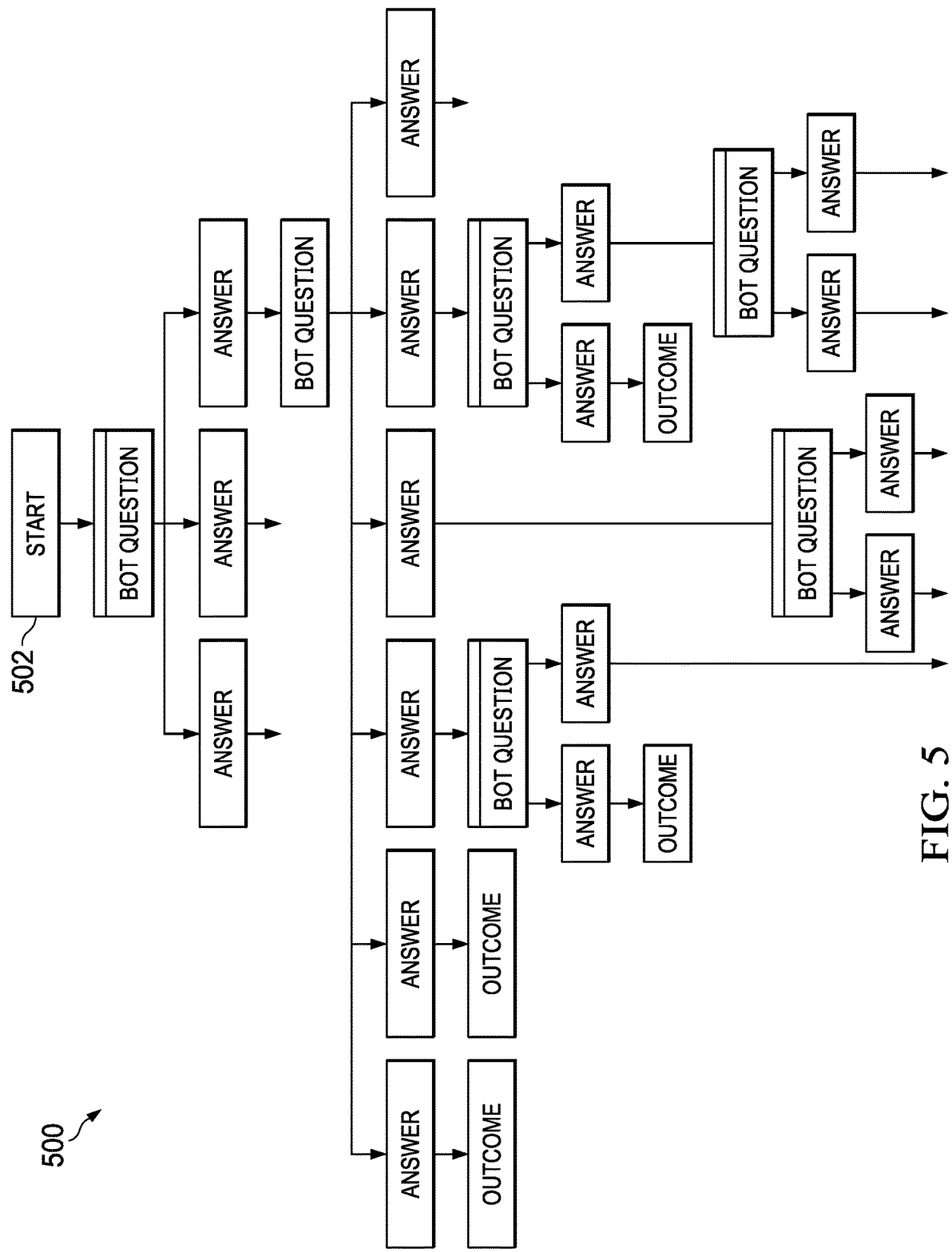
FIG. 5 depicts an example directed acyclic graph (DAG) designed to implement a conversational flow.
Figure 6:
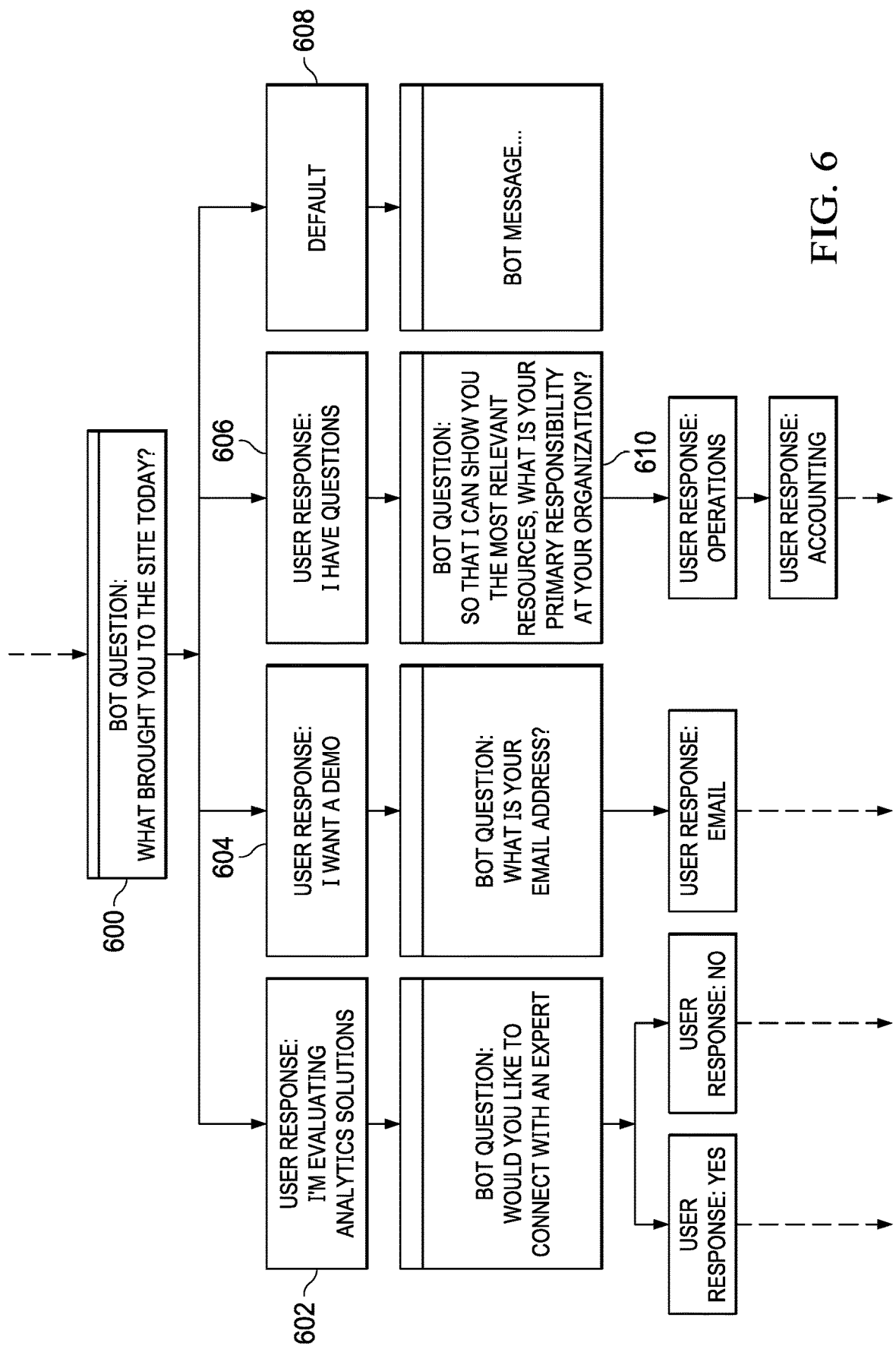
FIG. 6 depicts the example DAG in FIG. 5 zoomed in to depict a node below a root node.

FIG. 5 depicts an example directed acyclic graph (DAG) 500 designed to implement a conversational flow. In this example, the DAG has been designed in a visual builder tool, but this is not a limitation as noted above. As can be seen, the DAG depicts a number of top-down-oriented question and answer conversational pathways that the conversation may follow. The graph 500 begins at a root node 502. FIG. 6 depicts the example DAG in FIG. 5 zoomed in to depict a first node 600 below a root node. In this example, the first node controls the bot to ask the question "What brought you to the side today?" As can be seen, in this example graph there are four (4) possible responses 602, 604, 606 and 608 specified. The responses 602, 604 and 606 in this example are associated with a particular button activation in a UI (e.g., "I'm evaluating analytics solutions" or "I want a demo" or "I have questions"). Response 608 also provides a second type of response, e.g., a default response indicating a typed entry by the actor. Each such response is then followed by the follow-on nodes as depicted. For example, receipt of the response 606 (by the button activation) moves the flow to node 610, which asks a follow-on question "So I can show you the most relevant resources, what is your primary responsibility at your organization?" The relevant responses expected are then specified in the node. Thus, and as can be seen, the directed graph determines (decides) what questions the bot will ask next in the conversation.

Figure 7:
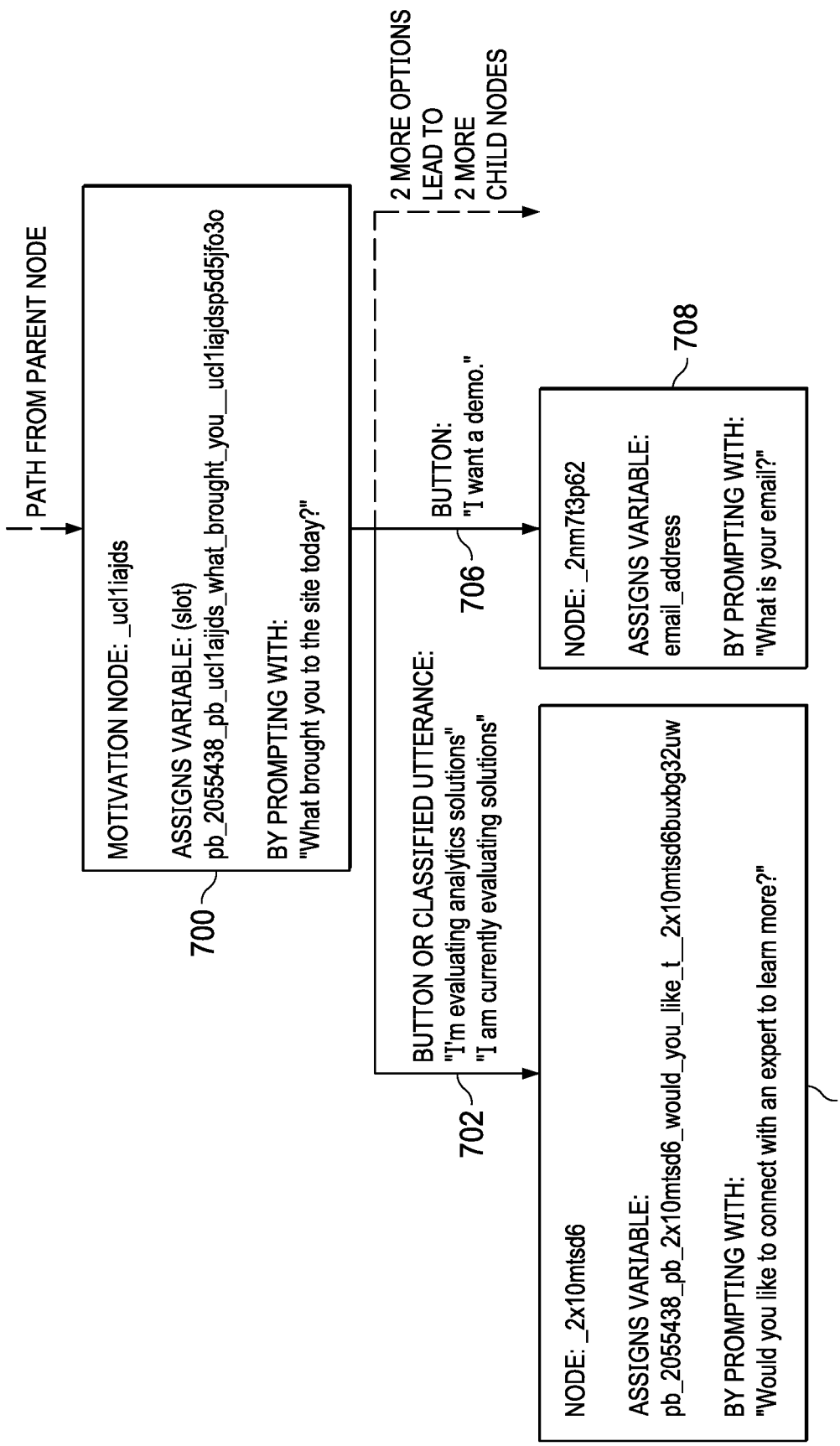
FIG. 7 depicts a more specific example of the node of the DAG in FIG. 6.

As described above, this type of graph-oriented top-down processing is combined with the "event" based approach described in FIGS. 1-4 to provide for a robust solution that is both proactive (top-down) and reactive (bottom-up, interrupt-based). FIG. 7 depicts a more specific example of the first node of the DAG in FIG. 6.

As was described, the DAG is a graph of variables to be assigned, together with how to branch based on the variable(s) values that have been assigned. Associated variable definitions are referenced to determine what text prompt the bot should use to ask the user for any value of any variable. FIG. 7 depicts the first node of the DAG in FIG. 6, showing the how the motivations and variables files are used to fill in the graph detail at the nodes. As depicted, the path from the parent node (in this case the root node, not shown) leads to the motivation node 700. This node assigns the identified variable by the identified prompt ("What bought you to the site today?"). Selection of particular buttons (e.g., I'm evaluating analytic solutions" or "I am currently evaluating solutions") or the recognition of the typed utterance takes the flow down the edge 702 to node 704, which assigns the identified variable by the identified prompt ("Would you like to connect . . . to learn more"?). If, however, the user selects the button for "I want a demo," flow moves instead down edge 706 to the node 708 that assigns the identified variable by the identified prompt ("What is your email?").

Figure 8:
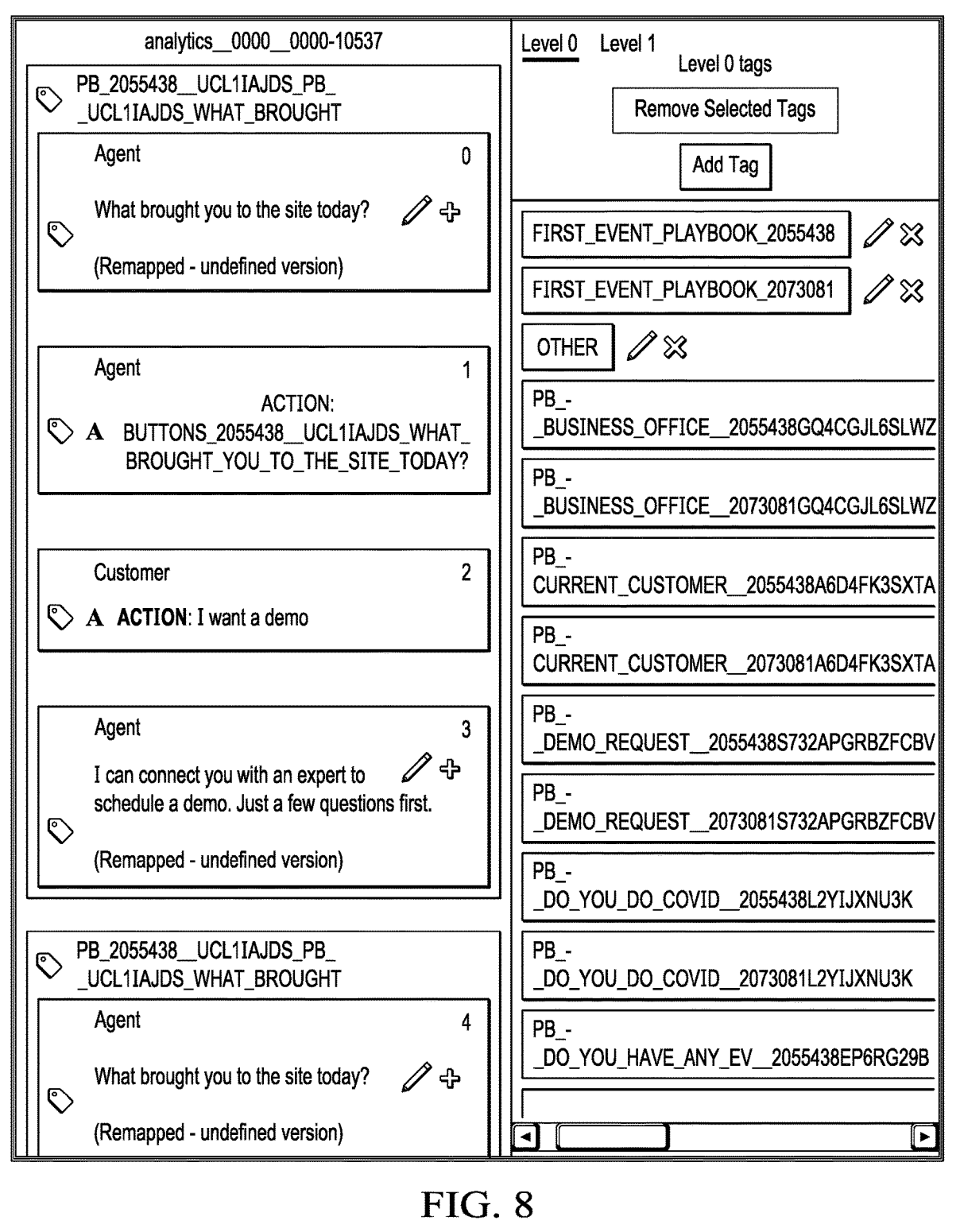

FIG. 8 depicts a set of synthetic transcripts for the DAG node shown in FIG. 7. In particular, this example shows a transcript 800 that is created from the first node 700 in FIG. 7. This synthetic transcript depicts the annotated event, with multiple annotated event expressions. In this example, the first expression ("playbook_node_event") handles the "I want a demo" option, whereas other expressions handle the button or classified utterance for "I am evaluating analytics solutions" in the FIG. 7 graph. On the right side, a corresponding set of synthetic events are specified.

FIG. 9 depicts a representative JSON object excerpt from a first (motivations) file for the node depicted in FIG. 7. In this example, the node 900 tells the bot to prompt the user with "What bought you to the site today?" The bot knows how to execute this by following the transcript that includes the event annotated with the label 902. The user's response assigns a value to a variable 904. As shown here and in FIG. 6, in this example there are four (4) branches the motivation can take from the prompt depending on the answer obtained from the user. These branches are nodes 906, 908, 910 and 912. When the user answers the previous node with a button or classified utterance equivalent to "I'm evaluating solutions" or "I am currently evaluating solutions," flow moves to node 908, and the user is prompted with "Would you like to connect with . . . to learn more?" The node 908 then assigns a value (not shown) to variable. FIG. 10 depicts a representative JSON object excerpt from a second (variables) file for the node depicted in FIG. 9. The variable specification 1000 for variable 914 in FIG. 9 is shown here. The variable prompts with a bot utterance labeled as 1002, and the variable can be assigned a value 1004 from either the specified button values, or the classified utterance. The above-described JSON examples in FIGS. 9 and 10 correspond to the motivation JSON graph representation shown in FIG. 7.

Generalizing, the directed acyclic graph (DAG) is pre-configured to specify a desired conversation flow. In this system, a node in the graph has associated therewith one or more synthetic conversation transcripts annotated with events, wherein an event in a synthetic conversation transcript has one or more preconfigured event expressions associated therewith that represent ways in which dialogue at the node can unfold. During an on-going conversation with an actor, a conversational bot system also provides the data model construct that uniquely associated with the on-going conversation and that specifies a linear sequence of observations that are captured during the on-going conversation. As described in FIGS. 1-4 above, the data model includes a set of one or more events representing semantically-related conversation fragments that have been located in a set of annotated historical conversation transcripts available to the system. The DAG and data model work together to control the bot-human interactions. In particular, and in response to receipt of a given input in association with a current node in the directed acyclic graph, the system determines whether the given input extends an event in the synthetic conversation transcript associated with the current node. Upon a determination that the given input does extend the event in the synthetic conversation transcript associated with the current node, a response is provided. The response is one that continues a current conversation flow in the directed acyclic graph, and typically it is based on the one or more event expressions preconfigured for the event. On the other hand, upon a determination that the given input does not extend the event in the synthetic conversation transcript associated with the current node, a response that interrupts a current conversation flow in the directed acyclic graph is provided. For example, the response that interrupts the current conversation flow is provided when the given input is found in a synthetic conversation transcript associated with a node in the directed acyclic graph other than the current node, when the given input is determined to start a new event in an annotated historical conversation transcript, or when the given input is determined to extend an event associated with a node in the graph other than the current node.

To provide several concrete examples, and as noted above, each node of the DAG has its own associated transcript of event expressions. Moreover, it is considered an "interruption" if what the user says does not extend the event that began when the system moved to the next node in the DAG. For example, imagine the system is following the DAG and arrives at, say, node 36, which prompts the user "Which countries do you do business in today?" This question begins step 1 of an event, where all ways this event might unfold are laid out in one synthetic transcript associated with node 36. If the user says "the US and France," the user has extended the event that was just started by node 36, and the user contributed step 2 of this event. Thus, no interruption to the current conversation flow occurs. If, however, the user says "I need to speak with a human immediately," the user has just initiated a new event that is not found in the synthetic transcript associated with node 36. This instead is step 1 of an anytime behavior, defined in a different synthetic transcript. It is still part of the DAG, but just not associated with node 36. To jump to the anytime behavior, the current conversation flow is interrupted. In an alternative, if instead the user said something like "Do you integrate with Salesforce?", this would be step 1 of a new event defined in a transcript for question and answer (Q&A) content and totally unrelated to the DAG, once again interrupting the current conversation flow. It is also possible that some number of steps in the past the bot asked the user for email, and the user did not give it to the bot. In this case the bot may have moved on with other questions. If the user later decides to say "ok, my email is bob@gmail.com," this user is extending an event from earlier in the conversation. In this case, the user is extending an event (not adding a new event), but the event has nothing to do with node 36.

Enabling Technologies

Typically, the computing platform is managed and operated "as-a-service" by a service provider entity. In one embodiment, the platform is accessible over the publicly-routed Internet at a particular domain, or sub-domain. The platform is a securely-connected infrastructure (typically via SSL/TLS connections), and that infrastructure includes data encrypted at rest, e.g., in an encrypted database, and in transit. The computing platform typically comprises a set of applications implemented as network-accessible services. One or more applications (services) may be combined with one another. An application (service) may be implemented using a set of computing resources that are co-located or themselves distributed. Typically, an application is implemented using one or more computing systems. The computing platform (or portions thereof) may be implemented in a dedicated environment, in an on-premises manner, as a cloud-based architecture, or some hybrid.

The system may be implemented on-premises (e.g., in an enterprise network), in a cloud computing environment, or in a hybrid infrastructure. An individual end user typically accesses the system using a user application executing on a computing device (e.g., mobile phone, tablet, laptop or desktop computer, Internet-connected appliance, etc.). In a typical use case, a user application is a mobile application (app) that a user obtains from a publicly-available source, such as a mobile application storefront. The platform may be managed and operated by a service provider. Although typically the platform is network-accessible, e.g., via the publicly-routed Internet, the computing system may be implemented in a standalone or on-premises manner. In addition, one or more of the identified components may interoperate with some other enterprise computing system or application.

Preferably, the platform supports a machine learning system. The nature and type of Machine Learning (ML) algorithms that are used to process the query may vary. As is known, ML algorithms iteratively learn from the data, thus allowing the system to find hidden insights without being explicitly programmed where to look. ML tasks are typically classified into various categories depending on the nature of the learning signal or feedback available to a learning system, namely supervised learning, unsupervised learning, and reinforcement learning. In supervised learning, the algorithm trains on labeled historic data and learns general rules that map input to output/target. The discovery of relationships between the input variables and the label/target variable in supervised learning is done with a training set, and the system learns from the training data. In this approach, a test set is used to evaluate whether the discovered relationships hold and the strength and utility of the predictive relationship is assessed by feeding the model with the input variables of the test data and comparing the label predicted by the model with the actual label of the data. The most widely used supervised learning algorithms are Support Vector Machines, linear regression, logistic regression, naive Bayes, and neural networks. As will be described, the techniques herein preferably leverage a network of neural networks. Formally, a NN is a function g: X→Y, where X is an input space, and Y is an output space representing a categorical set in a classification setting (or a real number in a regression setting). For a sample x that is an element of X, $g(x)=f_L(f_{L-1}(\ldots((f_1(x))))$. Each $f_i$ represents a layer, and $f_L$ is the last output layer. The last output layer creates a mapping from a hidden space to the output space (class labels) through a softmax function that outputs a vector of real numbers in the range [0, 1] that add up to 1. The output of the softmax function is a probability distribution of input x over C different possible output classes.

Thus, for example, in one embodiment, and without limitation, a neural network such as described is used to extract features from an utterance, with those extracted features then being used to train a Support Vector Machine (SVM).

In unsupervised machine learning, the algorithm trains on unlabeled data. The goal of these algorithms is to explore the data and find some structure within. The most widely used unsupervised learning algorithms are Cluster Analysis and Market Basket Analysis. In reinforcement learning, the algorithm learns through a feedback system. The algorithm takes actions and receives feedback about the appropriateness of its actions and based on the feedback, modifies the strategy and takes further actions that would maximize the expected reward over a given amount of time.

The following provides additional details regarding supervised machine learning. As noted above, supervised learning is the machine learning task of inferring a function from labeled training data. The training data consist of a set of training examples. In supervised learning, typically each example is a pair consisting of an input object (typically a vector), and a desired output value (also called the supervisory signal). A supervised learning algorithm analyzes the training data and produces an inferred function, which can be used for mapping new examples. An optimal scenario allows for the algorithm to correctly determine the class labels for unseen instances. This requires the learning algorithm to generalize reasonably from the training data to unseen situations.

For supervised learning, the following steps are used. An initial determination is what kind of data is to be used as a training set. The training set is then gathered. In particular, a set of input objects is gathered and corresponding outputs are also gathered, either from human experts or from measurements. Then, an input feature representation of the learned function is determined. In this approach, typically the input object is transformed into a feature vector, which contains a number of features that are descriptive of the object. The structure of the learned function and corresponding learning algorithm are then determined. For example, support vector machines or decision trees may be used. The learning algorithm is then run on the gathered training set. Some supervised learning algorithms require a user to determine certain control parameters. These parameters may be adjusted by optimizing performance on a subset (called a validation set) of the training set, or via cross-validation. The accuracy of the learned function is then evaluated. After parameter adjustment and learning, the performance of the resulting function is measured on a test set that is separate from the training set.

One or more functions of the computing platform of this disclosure may be implemented in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Other enabling technologies for the machine learning algorithms include, without limitation, vector autoregressive modeling (e.g., Autoregressive Integrated Moving Average (ARIMA)), state space modeling (e.g., using a Kalman filter), a Hidden Markov Model (HMM), recurrent neural network (RNN) modeling, RNN with long short-term memory (LSTM), Random Forests, Generalized Linear Models, Extreme Gradient Boosting, Extreme Random Trees, and others. By applying these modeling techniques, new types of features are extracted, e.g., as follows: model parameters (e.g. coefficients for dynamics, noise variance, etc.), latent states, and predicted values for a next couple of observation periods.

Typically, but without limitation, a client device is a mobile device, such as a smartphone, tablet, or wearable computing device, laptop or desktop. A typical mobile device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP.

Each above-described process preferably is implemented in computer software as a set of program instructions executable in one or more processors, as a special-purpose machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

The functionality may be implemented with other application layer protocols besides HTTP/HTTPS, or any other protocol having similar operating characteristics.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Each above-described process preferably is implemented in computer software as a set of program instructions executable in one or more processors, as a special-purpose machine.

The techniques herein generally provide for the above-described improvements to a technology or technical field, as well as the specific technological improvements to various fields, all as described above.

The above-described solution may be implemented across various use cases. A representative (but non-limiting) use case is a chatbot that is used as an alternative to a human Sales Development Representative (SDR) to help an organization scale to handle a larger volume of traffic that a sales team can support, and to handle conversations at off-hours or otherwise when no humans are standing by or available.

Although the above-described workflow is described in the context of a chat, this is not a limitation. Generalizing, the multi-turn conversation is one of: chat, e-mail, SMS and a voice-based interaction.

What is claimed is as follows:

1. A method to control a conversational bot, comprising:
providing a directed acyclic graph that specifies a desired conversation flow, wherein a node in the directed acyclic graph has associated therewith one or more synthetic conversation transcripts annotated with events, wherein an event in a synthetic conversation transcript has one or more preconfigured event expressions associated therewith that represent ways in which dialogue at the node can unfold;
during an on-going conversation with an actor:
providing a data model that specifies a linear sequence of observations, the data model including a set of one or more events representing semantically-related conversation fragments that have been located in a set of annotated historical conversation transcripts;
responsive to receipt of a given input in association with a current node in the directed acyclic graph, determining whether the given input extends an event in the synthetic conversation transcript associated with the current node;
upon a determination that the given input extends the event in the synthetic conversation transcript associated with the current node, providing a response that continues a current conversation flow in the directed acyclic graph; and
upon a determination that the given input does not extend the event in the synthetic conversation transcript associated with the current node, providing a response that interrupts a current conversation flow in the directed acyclic graph.

2. The method as described in claim 1 wherein the response that interrupts the current conversation flow is provided when the given input is found in a synthetic conversation transcript associated with a node in the directed acyclic graph other than the current node.

3. The method as described in claim 2 wherein the given input begins a new event and the synthetic conversation transcript associated with the node other than the current node defines a preconfigured anytime behavior.

4. The method as described in claim 1 wherein the response that interrupts the current conversation flow is provided when the given input is determined to start a new event in an annotated historical conversation transcript.

5. The method as described in claim 1 wherein the response that interrupts the current conversation flow is provided when the given input is determined to extend an event associated with a node in the directed acyclic graph other than the current node.

6. The method as described in claim 1 wherein the response that continues the current conversation flow is based on the one or more event expressions preconfigured for the event.

7. The method as described in claim 1 wherein the directed acyclic graph is a graph of variables to be assigned, together with instructions about how to branch based on the variable(s) values that are assigned.

8. The method as described in claim 7 wherein the directed acyclic graph has associated variable definitions that are referenced to determine what prompt the bot should use to ask the actor for any value of any variable.

9. The method as described in claim 8 further including skipping over a node in the directed acyclic graph during the desired conversation flow upon a determination that the bot already has a value for the variable for which the node is prompting.

10. The method as described in claim 1 further including configuring the directed acyclic graph with at least one anytime behavior sub-tree that interrupts the current conversation flow upon receipt of the given input.

11. The method as described in claim 10 further including positioning the at least one anytime behavior sub-tree at any location in the directed acyclic graph.

12. The method as described in claim 1 further including selectively blocking a route in the directed acyclic graph upon a given occurrence.

13. A software-as-a-service computing platform, comprising:
- computing hardware;
- computer software executing on the computer hardware, the computer software comprising program code executed on the computing hardware and configured to control conversational bot by:
- providing a directed acyclic graph that specifies a desired conversation flow, wherein a node in the directed acyclic graph has associated therewith one or more synthetic conversation transcripts annotated with events, wherein an event in a synthetic conversation transcript has one or more preconfigured event expressions associated therewith that represent ways in which dialogue at the node can unfold;
- during an on-going conversation with an actor:
  - providing a data model that specifies a linear sequence of observations, the data model including a set of one or more events representing semantically-related conversation fragments that have been located in a set of annotated historical conversation transcripts;
  - responsive to receipt of a given input in association with a current node in the directed acyclic graph, determining whether the given input extends an event in the synthetic conversation transcript associated with the current node;
  - upon a determination that the given input extends the event in the synthetic conversation transcript associated with the current node, providing a response that continues a current conversation flow in the directed acyclic graph; and
  - upon a determination that the given input does not extend the event in the synthetic conversation transcript associated with the current node, providing a response that interrupts a current conversation flow in the directed acyclic graph.

14. The computing platform as described in claim 13 wherein the response that interrupts the current conversation flow is provided when the given input is found in a synthetic conversation transcript associated with a node in the directed acyclic graph other than the current node.

15. The computing platform as described in claim 14 wherein the given input begins a new event and the synthetic conversation transcript associated with the node other than the current node defines a preconfigured anytime behavior.

16. The computing platform as described in claim 13 wherein the response that interrupts the current conversation flow is provided when the given input is determined to start a new event in an annotated historical conversation transcript.

17. The computing platform as described in claim 13 wherein the response that interrupts the current conversation flow is provided when the given input is determined to extend an event associated with a node in the directed acyclic graph other than the current node.

18. The computing platform as described in claim 13 wherein the response that continues the current conversation flow is based on the one or more event expressions preconfigured for the event.

19. A computer program product in a non-transitory computer-readable medium, the computer program product comprising program code executable by a data processing system to control a conversational bot by:
- providing a directed acyclic graph that specifies a desired conversation flow, wherein a node in the directed acyclic graph has associated therewith one or more synthetic conversation transcripts annotated with events, wherein an event in a synthetic conversation transcript has one or more preconfigured event expressions associated therewith that represent ways in which dialogue at the node can unfold;
- during an on-going conversation with an actor:
  - providing a data model that specifies a linear sequence of observations, the data model including a set of one or more events representing semantically-related conversation fragments that have been located in a set of annotated historical conversation transcripts;
  - responsive to receipt of a given input in association with a current node in the directed acyclic graph, determining whether the given input extends an event in the synthetic conversation transcript associated with the current node;
  - upon a determination that the given input extends the event in the synthetic conversation transcript associated with the current node, providing a response that continues a current conversation flow in the directed acyclic graph; and
  - upon a determination that the given input does not extend the event in the synthetic conversation transcript associated with the current node, providing a response that interrupts a current conversation flow in the directed acyclic graph.

* * * * *